March 22, 1966

R. L. ALLEN 3,241,491

FUEL INJECTION PUMP

Filed July 9, 1963

INVENTOR.
Robert L. Allen
BY
Newton, Hopkins & Jones
ATTORNEYS

INVENTOR.
Robert L. Allen
BY
Newton, Hopkins & Jones
ATTORNEYS

United States Patent Office 3,241,491
Patented Mar. 22, 1966

3,241,491
FUEL INJECTION PUMP
Robert L. Allen, Atlanta, Ga., assignor to Georgia Tech Research Institute, Atlanta, Ga., a corporation of Georgia
Filed July 9, 1963, Ser. No. 293,719
9 Claims. (Cl. 103—38)

This invention relates to fluid pumps, and more particularly to a fuel injection pump for injecting metered quantities of fuel into a combustion chamber of an Otto or four stroke cycle engine. Although only a single pump is described, it will be understood from the description of the invention that a plurality of pumps may be operatively associated to provide for the controlled injection of metered quantities of fuel into all of the plurality of combustion chambers of an Otto or four stroke cycle engine.

The performance of an Otto or four stroke cycle engine is dependent upon the accurate control of the combustible mixture introduced into and used in its combustion chambers. The combustible mixture used for an Otto or four stroke cycle engine is customarily a mixture of air and a hydrocarbon fuel and the proper performance of the engine is dependent upon the control of the amount of fuel and the amount of air injected or taken into the combustion chambers of the engine. The fuel is frequently injected into the combustion chambers of an Otto or four stroke cycle engine by a pumping means having a pump as an element and since the fuel requirements of the engine vary with the operating conditions of the engine, the pump must be capable of accurately injecting varying quantities of fuel.

This requirement for accurately injecting varying quantities of fuel as the operating conditions of an engine vary has been difficult for previous pumps to meet. This is because previous pumps using gaskets, washers or other similar means to define the fuel pumping chamber have tended to leak fuel from the pumping chamber. This leaking of fuel is hazardous because it may result in fuel coming into contact with hot portions of the engine. Moreover, the leaking of fuel from the pumping chamber varies the output of the pump and prevents the pump output from being the metered quantity desired and necessary for proper engine performance. The problems of previous pumps with respect to leaks have been particularly pronounced where the operating conditions of the engine with which the pump is used have required the pump to be operated at both high and low temperatures.

In addition, pumps used to inject fuel into the combustion chambers of an Otto or four stroke cycle engine are customarily driven by the revolutions of the engine and previous pumps have been generally characterized by a tendency for the fuel discharge rate to vary with changes in engine speed. This varying fuel discharge rate complicates in known manner the design of the injection nozzles customarily used to inject fuel into the combustion chambers of an Otto or four stroke cycle engine and frequently causes the engine to be difficult to start in cold weather because of the compromises in injection nozzle design which it makes necessary. In an effort to minimize the leakage problems described above and these discharge rate problems, previous pumps have been constructed to extremely close tolerances. This has not solved these problems in most cases and has simply made previous pumps costly to manufacture.

The metering pump disclosed herein completely overcomes these and other problems with previous pumps used in a pumping means to inject metered quantities of fuel into the combustion chambers of an Otto or four stroke cycle engine operating under a wide range of operating conditions. The pump of the invention is a fuel injection pump which has no rings, gaskets, washers, or similar means defining its pumping chamber. Thus, the pumping chamber has no tendency to leak at either high or low temperatures. Moreover, even though the pump of the invention is driven by engine revolutions, the discharge rate of the fuel injected into the combustion chamber of an Otto or four stroke cycle engine remains substantially constant over the range of engine operating speeds. This permits injection nozzle design to be simplified in known manner and a spray to be obtained which permits easier starting in cold weather. In addition, the construction of the pump of the invention is such that no close tolerances are necessary and the pump is convenient and inexpensive to fabricate and assemble.

The fuel injection pump of the invention achieves these improvements with a pumping chamber sealed by a bellows and into the interior of which the fuel intake passage and the fuel discharge passage open. It is the bellows arrangement which eliminates the possibility of leaks. The amount of fuel injected into the combustion chamber of an Otto or four stroke cycle engine is dependent upon the degree of expansion and collapse of the bellows. This is determined by the position of a lever which can be positioned in known manner in accordance with the fuel requirements of the engine.

It is the speed of collapse of the bellows which determines the discharge rate of the fuel injected into the combustion chamber of an Otto or four stroke cycle engine. This is a function of the expansion of a discharge spring and as a result remains relatively constant regardless of the degree of bellows collapse and of the amount of fuel injected into the combustion chamber of the engine. The frequency of fuel injection into a combustion chamber is controlled by a cam directly responsive to engine speed and which determines the frequency with which the discharge spring collapses the bellows.

These and other features and advantages of the invention will be more clearly understood from the following detailed description and the accompanying drawings in which like characters of reference designate corresponding parts in all figures, and in which.

These figures and the following detailed description disclose a preferred embodiment of the invention but the invention is not limited to the details disclosed since it may be embodied in other equivalent forms.

The specific embodiment of the fuel injection pump shown by way of illustration in the figures has a rectangular housing 20 with a rectangular recess 21 in its upper surface 22 and a circular recess 23 in it lower surface 24. The rectangular recess 21 in the housing 20 is closed by a cover plate 25 which is secured by bolts 26 or other known means to the upper surface 22 of the housing 20. The cover plate 25 and the rectangular recess 21 to form a reservoir chamber 28.

Integral with and extending above the cover plate 25 are a plunger column 29 and a spring column 30. The plunger 29 also extends below the cover plate 25 and has a cylindrical passage 31 extending from that end 32 of the plunger column 29 above the cover plate 25 and to the end 33 of the plunger column 29 below the cover plate 25. A circular access passage 34 extends between the cylindrical passage 31 and the chamber 28 through the end 33 of the plunger column 29. The centerlines of the cylindrical passage 31 and the circular access passage 34 coincide with each other and with the centerline of a threaded passage 35 extending between the chamber 28 and the circular recess 23.

The spring column 30 has a cylindrical spring recess 36 extending into it from the underside 37 of the cover plate 25. The centerline of the cylindrical spring recess 36 is substantially parallel to the centerline of the cylindrical passage 31 and coincides with the centerline of a cylindrical piston chamber 38 which extends from the chamber 28 into that portion of the housing 20 adjacent to the circular recess 23. The centerlines of the piston chamber 38 and of the circular recess 23 are substantially parallel to each other and an exchange passage 39 extends between the circular recess 23 and the piston chamber 38.

The centerline of the circular recess 23 coincides with the centerline of the threaded passage 35 and a cylindrical sleeve 40 is positioned within the circular recess 23 by threadedly inserting its threaded upper end into the threaded passage 35. The guide pin 41 of a bellows cup 42 is slidably inserted into the lower end 43 of the sleeve 40. The bellows cup 42 comprises a cylindrical shell 44 closed at its lower end by a base plate 45 and having an outwardly extending flange 46 at its upper end. The guide pin 41 extends within the cylindrical shell 44 from the base plate 45 and the slidable motion of the guide pin 41 in the sleeve 40 results in flange 46 and base plate 45 motion with respect to the sleeve 40 and the cylindrical recess 23 into which the sleeve 40 extends.

Concentric with the base plate 45 and slidably movable along the length of the cylindrical shell 44 of the bellows cup 42 is a ring 47. A mounting recess 48 extends into the lower surface 24 of the pump housing 20 concentric with the circular recess 23. The diameter of the mounting recess 48 is greater than the diameter of the circular recess 23 and as a result, a shoulder 49 is formed where the mounting recess 48 is continuous with the circular recess 23.

The ring 47 is positioned against the shoulder 49 when the bellows cup 42 is positioned within the circular recess 23 with the guide pin 41 slidably inserted into the sleeve 40. A bellows 50 surrounds the cylindrical shell 44 and extends within the circular recess 23 between the flange 46 and the ring 47. The bellows 50 is attached to the flange 46 and to the ring 47 by welding or other known means so as to produce a liquid tight seal between the flange 46 and the bellows 50 and between the ring 47 and the bellows 50. Moreover, the bellows 50 is of resilient material such as brass and its tendency to expand serves to force the flange 46 and ring 47 apart.

The length of the mounting recess 48 is greater than the thickness of the ring 47 and the ring 47 is firmly held in position against the shoulder 49 by threading the lower end of the mounting recess 48 and by threadably inserting into it the threaded circular plug 51 extending from the upper surface 52 of a fuel line insert 53. The ring 47 is firmly held between the shoulder 49 and the circular plug 51.

The circular plug 51 has a cylindrical cavity 54 extending into it which registers with the base plate 45 of the bellows cup 42 when the base plate 45 extends through the ring 47. Thus, as the base plate 45 slidably moves within the ring 47 with slidable motion of the guide pin 41 in the sleeve 40, the base plate 45 moves into and out of the cylindrical cavity 54. It is the cylindrical cavity 54, the ring 47, and the base plate 45 which define the pumping chamber 55 of the fuel injection pump of the invention.

The fuel being pumped by the pump is discharged from the pumping chamber 55 through a fuel discharge passage 56 extending from the cylindrical cavity 54 through the fuel line insert 53. A fuel line F is inserted into the fuel discharge passage 56 and a check valve 57 is firmly positioned by a shoulder 58 formed within the fuel line F and a shoulder 59 formed in the fuel discharge passage 56. The check valve 57 is of conventional spring 60 and ball 61 design and is arranged in known manner so that fuel will flow under pressure greater than that exerted by the spring 60 from the cylindrical cavity 54 through the fuel line F, but will not flow from the fuel line F into the cylindrical cavity 54. The fuel line F is connected in known manner to a fuel injection nozzle (not shown) of known type positioned in known manner so as to inject fuel into the combustion chamber of one cylinder of an engine (not shown).

Fuel enters the pumping chamber 55 through a fuel inlet port 63 in the cylindrical cavity 54. The fuel inlet port 63 is at the upper end of and forms a shoulder 62 with a vertical passage 64 extending through the fuel line insert 53 and in which a valve insert 65 is fixedly positioned. The valve insert 65 is a hollow cylindrical plug having its hollow interior 66 in communication with a fuel inlet passage 67 in the fuel line insert 53 through an inlet port 68 and in communication with the pumping chamber 55 and the fuel inlet port 63 through a discharge port 69.

A valve plunger 70 extends through the discharge port 69. The plunger 70 has a disc 75 at its upper end and a flange 76 at its lower end and the plunger 70 is held in position so that the disc 75 is over the discharge port 69 by a conical spring 71 surrounding the plunger 70 and extending between the upper end of the hollow interior 66 of the valve insert 65 and the flange 76. The spring 71 permits the disc 75 of the plunger 70 to raise and allow the passage of fuel into the pumping chamber 55 when the fuel pressure in the fuel inlet passage 67 and the hollow interior 66 exceeds the fuel pressure in the pumping chamber 55 by an amount greater than the pressure exerted by the spring 71 on the flange 76. Pumping pressure within the pumping chamber 55 forces the disc 75 of the plunger 70 down over the discharge port 69 to prevent the passage of fuel from the pumping chamber 55 into the hollow interior 66 of the valve insert 65.

Thus, the valve insert 65 serves to permit the passage of fuel from the fuel inlet passage 67 into the pumping chamber 55 but will prevent the passage of fuel from the pumping chamber 55 into the fuel inlet passage 67. The fuel inlet passage 67 is connected in known manner to a fuel pump (not shown) of known type which is used in the usual well understood manner to pump fuel from a tank (not shown) or other source of fuel supply for the engine (not shown).

A pumping piston 80 is slidably inserted into the piston chamber 38. The pumping piston 80 has a shoulder 81 formed at its upper end and the lower end of a pumping spring 82 is seated on the shoulder 81. The pumping spring 82 extends into the spring recess 36 of the spring column 30 and upward motion of the pumping piston 80 within the piston chamber 38 causes a compression of the pumping spring 82 which urges the pumping piston 80 downward in the piston chamber 38.

The pumping piston 80 has an actuator bar slot 83 cut into its side and a rectangular actuator bar 84 is slidably inserted into the actuator bar slot 83. The actuator bar 84 extends completely through the pumping piston 80 with its centerline substantially perpendicular to the centerline of the pumping piston 80 and the actuator bar slot 83 extends into the pumping piston 80 in a direction substantially perpendicular to the centerline of the pumping piston 80.

One extending end of the actuator bar 84 is formed into a post 85 and the other extending end of the actuator bar 84 is formed into a post 86. The post 85 is rotatably inserted into a first lever arm 87 and the post 86 is rotatably inserted into a second lever arm 88. A cam axle 89 is fixedly positioned within the chamber 28 and one end 90 of the first lever arm 87 is pivotally mounted on the axle 89 and one end 91 of the second lever arm 88 is pivotally mounted on the axle 89. The centerline of the axle 89 is in a plane of reference substantially perpendicular to the centerline of the pumping piston 80 and the pumping piston 80 is between the lever arms 87 and 88 as they extend parallel to each other from the axle 89.

The extending ends 92 and 93 of the lever arms 87 and 88 are integral with a cam follower 94 which is more remote from the cam axle 89 than the pumping piston 80. Motion of the cam follower 94 causes pivotal motion about the cam axle 89 of the lever arms 87 and 88 and of the actuator bar 84 extending between the lever arms 87 and 88. The pivotal motion of the actuator bar 84 in turn causes motion of the pumping piston 80. The slidable motion of the actuator bar 84 within the actuator bar slot 83 permits the curved motion of the actuator bar 84 to impart linear motion to the pumping piston 80 along the centerline of the pumping piston 80.

The cam follower 94 is a rectangular plate and rests on a cam 95 at one end of a cam shaft 96 extending into the chamber 28. The cam shaft 96 rotatably extends into the chamber 28 through a cam shaft passage 97 in the pump housing 20. The centerline of the cam shaft 96 is in a plane of reference perpendicular to the centerline of the pumping piston 80 and the position of the cam 95 under the cam follower 94 is maintained in known manner by a bushing 98 of known type.

A pulley 99 is fixedly mounted on the extending end of the cam shaft 96. The pulley 99 is connected in known manner by a belt 100 to a power pulley (not shown) responsive to revolutions of the engine so that the cam shaft 96 is rotated one revolution for each two revolutions of the engine (not shown). The result of foregoing arrangement is that the cam 95 rotates one complete revolution each time the engine (not shown) with which the fuel injection pump of the invention is being used completes the four well-known strokes of an Otto or four stroke cycle engine.

Figure 1:
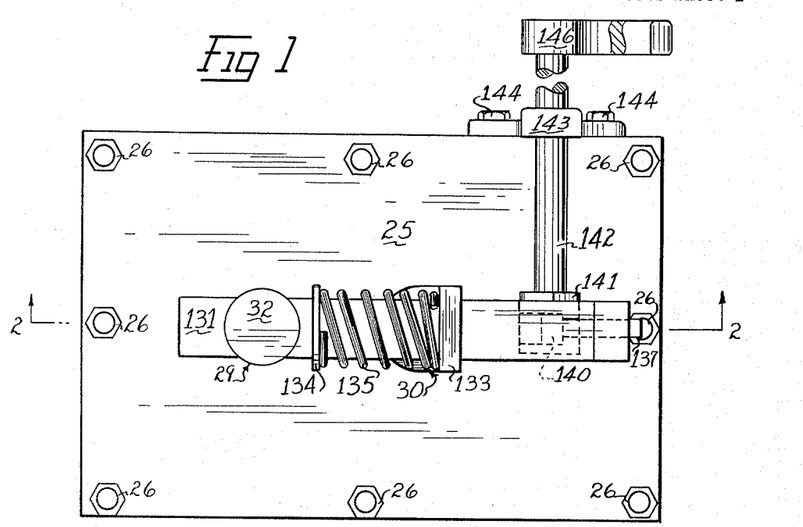
FIG. 1 is a top plan view of the fuel injection pump.
Figure 2:
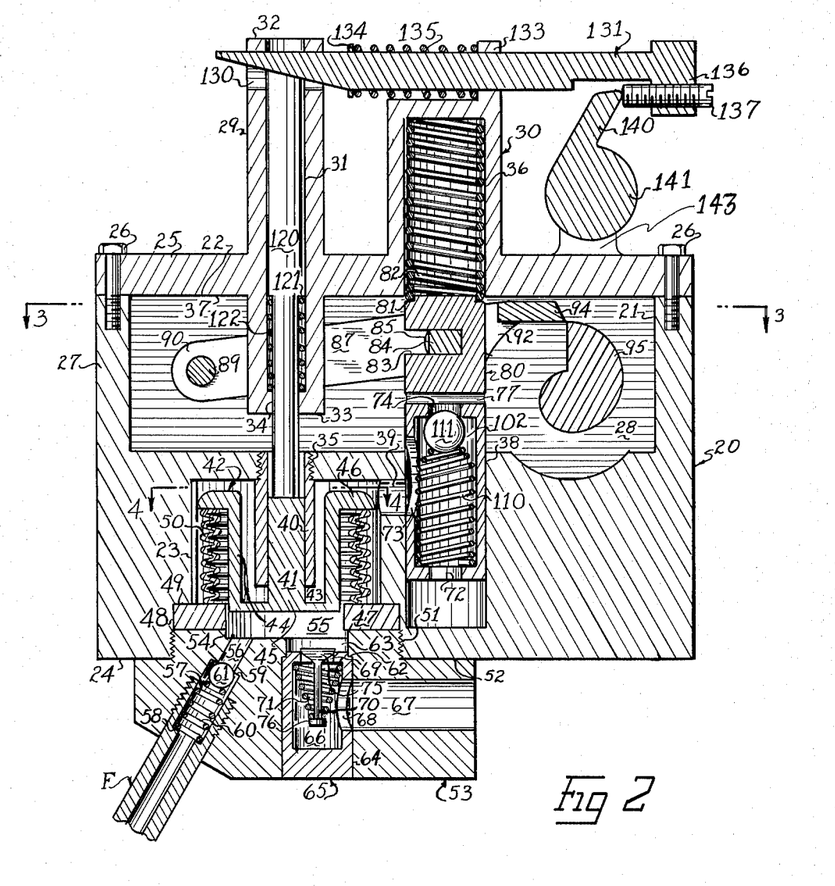
FIG. 2 is a sectional view of the fuel injection pump taken in line 2—2 in FIG. 1.
Figure 3:
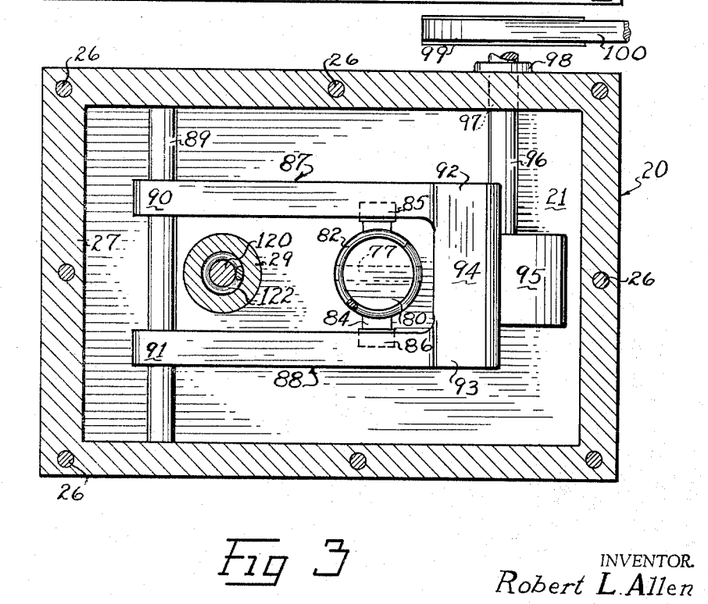
FIG. 3 is a sectional view of the fuel injection pump as it would appear in line 3—3 in FIG. 2 if FIG. 2 were an elevation view rather than a section view.
Figure 4:
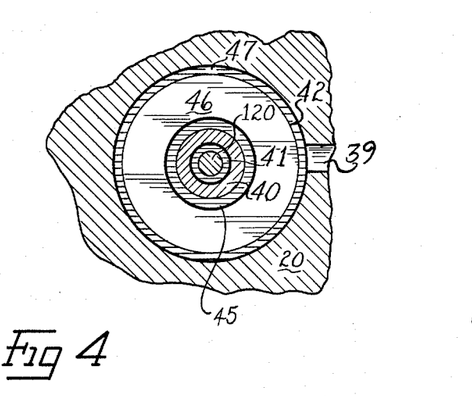
FIG. 4 is a sectional view of the fuel portion of the fuel injection pump as it would appear in line 4—4 in FIG. 2 if FIG. 2 were an elevation view rather than a section view.
Figure 5:
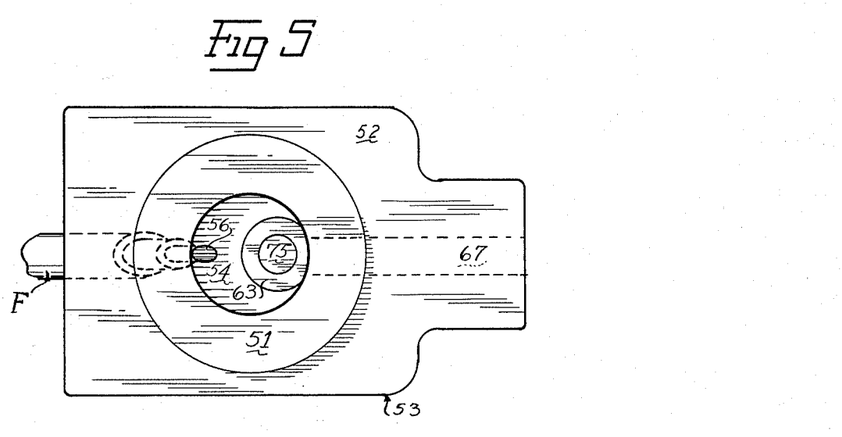
FIG. 5 is a top plan view of the fuel line insert.
Figure 6:
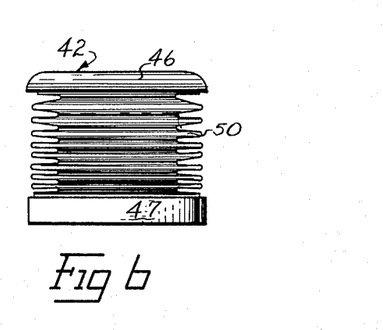
FIG. 6 is a side elevational view of the bellows which seals the fuel pumping chamber.

As shown in FIG. 2, the cam 95 is shaped so that its rotation slowly raises the cam follower 94 until a point is reached at which the diameter of the cam 95 decreases sharply and permits the cam follower 94 to drop. As the cam follower 94 is slowly raised by the cam 95, the pumping piston 80 is raised against the force exerted by the pumping spring 82. The force of the pumping spring 82 resulting from its compression forces the pumping piston 80 and the cam follower 94 down when that point on the cam 95 which permits the cam follower 94 to drop is reached. Thus, rotation of the cam shaft 96 causes upward motion of the pumping piston 80 against pumping spring 82 pressure and downward motion of the pumping piston 80 as the result of pumping spring 82 pressure.

The speed at which the cam shaft 96 rotates determines the frequency with which the pumping piston 80 is raised and lowered in the piston chamber 38. However, each time the pumping piston 80 is raised, it compresses the pumping spring 82 by the same amount. Since the weight of the cam follower 94 and other elements of the pump raised by the cam 95 also remain constant, each time the pumping piston 80 is driven downward into the piston chamber 38, it is driven downward with the same force. The lower end of the pumping piston 80 has a fluid chamber 102 formed in it. A first fluid passage 72 extends from the fluid chamber 102 through the lower end of the pumping piston 80 to place the fluid chamber 102 in communication with the lower end of the piston chamber 38. A second fluid passage 73 extends from the fluid chamber 102 of the pumping piston 80 through that side of the pumping piston 80 which is contiguous with the wall of the piston chamber 38 through which the exchange passage 39 from the circular recess 23 extends.

The second fluid passage 73 is elliptical with its long or major axis parallel to the centerline of the pumping piston 80 and of sufficient length to insure that as the pumping piston 80 moves in the piston chamber 38, a portion of the second fluid passage 73 always registers with the exchange passage 39. Moreover, the second fluid passage 73 is positioned and sufficiently long to place the fluid chamber 102 in communication with the reservoir chamber 28 when the pumping piston 80 is fully raised by the cam 95 as described above. Thus, as the pumping piston 80 moves reciprocally in the piston chamber 38, the fluid chamber 102 of the pumping piston 80 is always in communication with the interior of the circular recess 23 and when the pumping piston 80 is fully raised, the fluid chamber 102 is in communication with the chamber 28.

A third fluid passage 74 extends between the fluid chamber 102 of the pumping piston 80 and a transverse passage 77 extending through the pumping piston 80 with its centerline perpendicular to the centerline of pumping piston 80. This third fluid passage 74 and the transverse passage 77 also place the fluid chamber 102 of the pumping piston 80 in communication with the reservoir chamber 28.

Within the fluid chamber 102 of the pumping piston 80 is a check spring 110. This check spring 110 is positioned between the lower end of the fluid chamber 102 and a check ball 111 and urges the check ball 111 toward and into the third fluid passage 74 so as to permit fluid to pass between the fluid chamber 102 of the pumping piston 80 and the reservoir chamber 28 if the fluid pressure in the fluid chamber 102 is less than the pressure in the reservoir chamber 28 by an amount greater than the pressure of check spring 110.

A two-segment plunger 120 is slidably inserted into the plunger column 29. The two segments of the plunger 120 are integral with each other and concentric about the same centerline and the lower segment has a smaller diameter than the upper segment so as to form a shoulder 121 where the two segments are continuous with each other. The lower segment of the plunger 120 has a diameter substantially identical to the diameter of the circular access passage 34 and extends through the circular access passage 34 and into the sleeve 40. The upper segment of the plunger 120 has a diameter substantially identical to the diameter of the cylindrical passage 31 and a positioning spring 122 is positioned around the lower segment of the plunger 29 between the lower end of the cylindrical passage 31 and the shoulder 121. The positioning spring 122 urges the plunger 120 upward within the plunger column 29.

The upper end of the plunger column 29 has a rectangular passage 130 extending through it and a rectangular positioning bar 131 is inserted through the rectangular passage 130. That end of the positioning bar 131 inserted into the rectangular passage 130 and through the plunger column 29 is canted and is engaged by the upper end of the plunger 120 which is canted in a corresponding manner. Thus, the degree to which the positioning bar 131 is inserted through the plunger column 29 determines the vertical position of the plunger 120 within the plunger column 29. As clearly seen in FIG. 2, motion of the positioning bar 131 toward the plunger column 29 forces the plunger 120 into the sleeve 40 against positioning spring 122 pressure.

The positioning bar 131 extends through a bracket 133 integral with the upper end of the spring column 30. A positioning ring 134 is fixedly attached to the positioning bar 131 between the bracket 133 and the plunger column 29 and the positioning bar 131 is urged into the rectangular passage 130 by a control spring 135 extending between the positioning ring 134 and the bracket 133. That end of the positioning bar 131 most remote from the plunger column 29 is integral with a bolt support block 136 into the lower portion of which a bolt 137 is threadably inserted.

The centerline of the bolt 137 is substantially parallel to the centerline of the positioning bar 131 and that end of the bolt 137 extending toward the plunger column 29 is engaged by a pawl 140 extending from a circular pawl carrier 141 fixedly mounted at one end of a fuel control axle 142. The fuel control axle 142 extends through a bracket 143 attached by bolts 144 or other known means to the housing 20. A control lever 146 is fixedly attached to that end of the fuel control axle 142 most remote from the pawl carrier 141 and motion of control lever 146 causes rotation of the fuel control axle 142 and pivotal motion of the pawl 140. Motion of the control lever 146 in one direction will cause the pawl 140 to pivot toward the plunger column 29 and the bolt 137 and positioning bar 131 to move toward the plunger column 29 under the influence of control spring 135.

The result of this control lever 146 motion is that the plunger is forced downward within the plunger column 29 and into the sleeve 40 against positioning spring 122 pressure. Rotation of the control lever 146 in the opposite direction will cause pivoting of the pawl 140 away from the plunger column 29 with the result that the positioning bar 131 is forced away from the plunger column 29 against control spring 135 pressure. This causes the plunger 120 to move upward within the plunger column 29 and sleeve 40 under the influence of positioning spring 122. Thus, motion of the control lever 146 varies the extent to which the plunger 120 is inserted into the sleeve 40. The degree to which the plunger 120 is inserted into the sleeve 40 for a given rotational position of the lever 146 can be changed by adjusting the position of the bolt 137.

*Operation*

The operation of the fuel injection pump disclosed herein is best understood by first considering the fuel injection pump after it has discharged fuel but before additional fuel has entered its pumping chamber 55. At this point in the operation of the fuel injection pump, the base plate 45 is extended into the cylindrical cavity 54 and is engaging the fuel line insert 53. In addition, the bellows 50 is completely collapsed as the result of the movement of the flange 46 toward the ring 47. Thus, both the pumping chamber 55 and the space within the bellows 50 between the bellows 50 and the cylindrical shell 44 are of minimum size.

When the pumping chamber 55 is of minimum size as described above, the cam follower 94 has just passed that point on the cam 95 at which the cam follower 94 drops and the pumping piston 80 is being forced into the piston chamber 38 by the pumping spring 82. With the pumping piston 80 in this position, a substantially noncompressible liquid such as hydraulic fluid completely fills the fluid chamber 102 and the fluid passages 72 and 72 of the pumping piston 80, the exchange passage 39, and those portions of the circular recess 23 surrounding the bellows 50, the bellows cup 42 and the sleeve 40.

The check ball 111 is being forced into the fluid passage 74 by the liquid pressure in the fluid chamber 102 and prevents the escape of the liquid from the volume defined and although the plunger 120 is not engaging the guide pin 41 in the sleeve 40 because the positioning spring 122 is maintaining the plunger 120 in a raised position limited by positioning bar 131, the pressure of the liquid in the cylindrical recess 23 prevents the bellows cup 42 from moving upward. Thus, fuel being forced into the fuel inlet passage 67 by a conventional fuel pump (not shown) will simply fill the fuel inlet passage 67, the hollow interior 66 of the valve insert 65, the discharge port 69, the fuel inlet port 63, and the space between the collapsed bellows 50 and the cylindrical shell 44.

As the engine (not shown) drives the belt 100, the pulley 99 and the cam shaft 96 rotate. The rotation of the cam shaft 96 causes the cam 95 to rotate in a clockwise direction as viewed in FIG. 2 and the cam follower 94 to move upward. The upward motion of the cam follower 94 causes the pumping piston 80 to move upward in the piston chamber 38 in the manner already described. This upward motion of the pumping piston 80 creates a space in the piston chamber 38 beneath the pumping piston 80 and liquid flows into this space from the fluid chamber 102. As liquid passes from the fluid chamber 102, liquid passes into the fluid chamber 102 through the fluid passage 73 and the exchange passage 39 from the circular recess 23. This release of liquid from the circular recess 23 permits the resiliency of the bellows 50 and the pressure of the fuel in the fuel inlet passage 67 to force the base plate 45 and guide pin 41 upward away from the fuel line insert 53. Thus, fuel enters the pumping chamber 55 and the space between the bellows 50 and the cylindrical shell 44.

The pumping piston 80 moves upward rapidly at high engine speeds because of the resulting high rotational speed of the cam 95. This rapid upward motion of pumping piston 80 tends to create a vacuum in the fluid chamber 102 or circular recess 23 if the upward motion of the base plate 45 is not equally rapid. However, the reservoir chamber 28 contains liquid at atmospheric pressure and if a vacuum starts to develop because the upward motion of the pumping piston 80 creates space in the piston chamber 38 more rapidly than the expanding bellows 50 reduces space in the circular recess 23, the check ball 111 will move downward against check spring 110 pressure. This permits liquid to enter the fluid chamber 102 from the reservoir chamber 28 from the fluid passage 74 and the transverse passage 77, and insures that air bubbles are not formed.

As the pumping piston 80 continues to move upward because of the continuing rotation of the cam 95, the fluid passage 73 moves into that position at which it places the fluid chamber 102 and the reservoir chamber 28 in communication. As a result, liquid flows freely at atmospheric pressure among the circular recess 23, the fluid chamber 102, and the reservoir chamber 28. This arrangement permits the bellows 50 to continue to expand without restriction by the liquid and insures that the fluid chamber 102, the space beneath the pumping piston 80, and the space in the circular recess 23 surrounding the bellows 50 are full of liquid regardless of the degree of bellows 50 expansion.

The upward motion of the pumping piston 80 continues until that point at which the cam follower 94 drops is reached on the cam 95. However, the bellows cup 42 continues to move upward only until the guide pin 41 engages the lower end of the plunger 120 in the sleeve 40. Thus, the position of the plunger 120 as fixed in the manner already described limits the size to which the pumping chamber 55 can increase and the amount of bellows 50 expansion. This in turn limits the quantity of fuel that enters the fuel injection pump and it is by varying the position of the plunger 120 so as to vary the upward motion of the bellows cup 42 that motion of the control lever 146 varies the fuel output of the pump.

When that point on the cam 95 at which the cam bar 94 drops is again reached with rotation of the cam 95, the pumping spring 82 forces the pumping piston 80 downward into the piston chamber 38. The fluid chamber 102 of the pumping piston 80 and the space in the piston chamber 38 beneath the pumping piston 80 are filled with liquid from the circular recess 23 or reservoir chamber 28, and as this pumping piston 80 starts downward, the liquid passage 73 closes with respect to the reservoir chamber 28 and the fluid chamber 102, and the pressure in the fluid chamber 102 becomes greater than the pressure of the check spring 110. This causes the check ball 111 to seal the fluid passage 74 and the continuing downward motion of the pumping piston 80 to force liquid into the circular recess 23 under pressure. The liquid entering the circular recess 23 under pressure forces the bellows cup 42 downward and causes fuel to be forced from the pumping chamber 55 and from between the collapsing bellows 50 and the cylindrical shell 44. The pumping piston 80 will move downward under pumping spring 82 pressure until all the fuel taken into the fuel injection pump when the pumping piston 80 moved upward is discharged through the fuel discharge passage 56. At this point, the cycle of injection pump operation will be repeated.

Although the construction and operation of the fuel injection pump have been described for convenience in terms of the pumping piston 80 moving upward and downward, it should be understood that the pump is not restricted to use with this orientation. From the operation described, it is apparent that the quantity of fuel pumped is dependent upon the position of the plunger 120 and that regardless of the quantity of fuel pumped, it is always pumped by the force of the pumping spring 82 after it has been fully compressed. The frequency of pumping action is dependent upon cam 95 rotation and the frequency and moment of pumping spring 82 action can be related in known manner to the operating characteristics of the engine. Regardless of the quantity of fuel pumped, the bellows 50 provides an efficient and durable seal between the fuel and the non-compressible liquid without the use of rings and gaskets and parts manufactured to close tolerances.

It will be obvious that many variations may be made in the embodiment here chosen for the purpose of illustrating the present invention without departing from the scope thereof as defined by the appended claims.

What is claimed as invention is:

1. A fuel injection pump for injecting fuel into an internal combustion engine in response to engine speed and the fuel requirements of the engine, said pump comprising, in combination, a housing having a circular chamber; a ring in the said circular chamber and having the passage through it closed at its first end and open at its second end; a shell having its first end in the circular chamber and its second end closed and insertable into the second end of the passage through the ring; a flange extending outwardly from the first end of the shell; a bellows encircling the shell and having its first end joined to the flange and its second end joined to the ring, said bellows with the ring, shell and flange forming a fuel chamber; a non-compressible liquid filling the interior of the circular chamber not occupied by the said fuel chamber; means for forcing fuel into the said fuel chamber at a first pressure; means for releasing fuel from the said fuel chamber and into the engine, said means being responsive to a second pressure greater than the said first pressure; means for changing the pressure of the said liquid in the circular chamber from a pressure less than the said first pressure to a pressure greater than the said second pressure, said means being responsive to the speed of the engine; and means for restricting the motion of the shell relative to the ring, said means being responsive to the fuel requirements of the engine.

2. A fuel injection pump for injecting fuel into an internal combustion engine in response to engine speed and the fuel requirements of the engine, said pump comprising, in combination, a housing having a liquid chamber; a plate in the said liquid chamber and having the passage through it closed at its first end and open at its second end; a shell having its first end in the liquid chamber and its second end closed and insertable into the second end of the passage through the plate; a flange extending outwardly from the first end of the shell; an expandable collapsible bellows encircling the shell and having its first end joined to the flange and its second end joined to the plate, said bellows with the ring, shell and flange forming a fuel chamber; a non-compressible liquid filling the interior of the liquid chamber not occupied by the said fuel chamber; means for forcing fuel into the said fuel chamber at a first pressure; means for releasing fuel from the said fuel chamber and into the engine, said means being responsive to a second pressure greater than the said first pressure; means for changing the pressure of the said liquid in the liquid chamber from a pressure less than the said first pressure to a pressure greater than the said second pressure, said means being responsive to the speed of the engine; and means for restricting the motion of the shell relative to the ring, said means being responsive to the fuel requirements of the engine.

3. A fuel injection pump for injecting fuel into an internal combustion engine in response to engine speed and the fuel requirements of the engine, said pump comprising, in combination, a housing having a first chamber, a piston chamber, and a liquid chamber joined to the piston chamber by an exchange passage; a ring in the said liquid chamber and having the passage through it closed at its first end and open at its second end; a shell having its first end in the liquid chamber and its second end closed and insertable into the second end of the passage through the ring; a flange extending outwardly from the first end of the shell; a bellows encircling the shell and having its first end joined to the flange and its second end joined to the ring, said bellows with the ring, shell and flange forming a fuel chamber; means for forcing fuel into the said fuel chamber at a first pressure; means for releasing fuel from the said fuel chamber and into the engine, said means being responsive to a second pressure greater than the said first pressure; means for restricting the motion of the shell relative to the ring; said means being responsive to the fuel requirements of the engine; a pumping piston with its upper end in the first chamber and its lower end slidably inserted into the piston chamber, the upper end of said piston having an actuator bar slot and a transverse passage extending through it and the lower end of said piston having a fluid chamber, a first fluid passage joining the fluid chamber to the piston chamber below the pumping piston, a second fluid passage joining the fluid chamber to the transverse passage, and a third fluid passage positioned to join the fluid chamber and the exchange passage continuously as the pumping piston slidably moves in the piston chamber and to join the fluid chamber and the first chamber when the lower end of the pumping piston is substantially withdrawn from the piston chamber; a lever arm axle fixedly positioned in the upper chamber; a first lever arm having one end pivotally attached to the lever arm axle; a second lever arm having one end pivotally attached to the lever arm axle; an actuator bar rotatably extending between the first lever arm and the second lever arm and through the said actuator bar slot; a cam follower fixedly extending between the first lever arm and the second lever arm; a cam axle rotatably extending into the first chamber; a cam fixedly mounted on the cam axle within the first chamber, said cam engaging the cam follower and having a configuration which slowly moves the cam follower away from the cam axle and then suddenly allows the cam follower to move toward the cam axle; a pumping spring having one end engaging the upper end of the pumping piston and urging the lower end of the pumping piston into the piston chamber with a force substantially equal to the said second pressure; means for rotating the cam axle, said means being responsive to the speed of the engine; a non-compressible liquid filling the fluid chamber, the first chamber, and the interior of the liquid chamber not occupied by the said fuel chamber; and means for preventing the said non-compressible liquid from passing through the third fluid passage when the pressure in the fluid chamber is substantially equal to the said second pressure.

4. A fuel injection pump for injecting fuel into an internal combustion engine in response to engine speed and the fuel requirements of the engine, said pump comprising a housing having a first chamber; a ring in the said first chamber and having the passage through it closed at its first end and open at its second end; a hollow shell having its first end in the first chamber and its second end closed and insertable into the second end of the passage through the ring; a flange extending outwardly from the first end of the shell; a bellows encircling the shell and having its first end joined to the flange and its second end joined to the ring, said bellows with the ring, shell and flange forming a fuel chamber; a sleeve with a first end and a second end extending into the first end of the shell; a guide pin having its first end fixedly attached to the shell and its second end slidably inserted into the second end of the sleeve; a non-compressible liquid filling the interior of the first chamber not occupied by the sleeve, guide pin and said fuel chamber; means for forcing fuel into the said fuel chamber at a first pressure; means for releasing fuel from the said fuel chamber and into the engine, said means being responsive to a second pressure greater than the said first pressure; means for changing the pressure of the said liquid in the first chamber from a pressure less than the said first pressure to a pressure greater than the said second pressure, said means being responsive to the speed of the engine; a plunger column fixedly positioned on the housing and having a circular passage extending its length and a rectangular passage joining the circular passage and extending through the plunger column transversely; a plunger with its lower end slidably inserted into the first end of the sleeve and its second end canted and slidably inserted into the circular passage in the plunger column; a bracket fixedly mounted on the housing; a rectangular positioning bar slidably extending through the bracket and the said rectangular passage and having a canted surface which engages the canted second end of the plunger; a positioning ring fixedly positioned on the positioning bar between the bracket and the plunger column; a control spring extending between the positioning ring and the bracket and urging them apart; a bolt support integral with the positioning bar; a bolt threadably inserted in the bolt support with its first end extending toward the plunger column; a control axle rotatably extending adjacent to the bolt; a pawl fixedly positioned on the control axle and engaging the first end of the bolt; and means for rotating the control axle in response to the fuel requirements of the engine.

5. A pump for pumping selected quantities of a first liquid, said pump comprising, in combination, a housing having a circular recess; a circular plug closing the circular recess; a ring positioned on the circular plug within the circular recess; a cylindrical shell within the circular recess with its first end slidably extending into the ring and its second end more remote from the plug than the ring; a flange integral with the second end of the cylindrical shell; a base plate closing the first end of the cylindrical shell; a bellows surrounding the cylindrical shell and having one end joined to the ring and its other end joined to the flange, said bellows, plug, ring, base plate, flange and cylindrical shell forming a liquid-tight chamber; means for selectively limiting the motion of the first end of the cylindrical shell relative to the ring; means for alternately increasing and decreasing the pressure on a non-compressible second liquid in the circular recess exterior to the liquid tight chamber; and means for permitting the first liquid to enter and be discharged from the liquid-tight chamber, said means permitting the entry of the first liquid only at a first pressure and permitting the discharge of the first liquid at a second pressure greater than the first pressure.

6. A pump for pumping a first liquid, said pump comprising, in combination, a housing having a recess; a plug closing the recess; a shell within the recess with a first end and a second end adjacent to the plug; a flange integral with the first end of the shell; a plate closing the second end of the shell; a bellows surrounding the shell and having one end joined to the plug and its other end joined to the flange, said bellows, plug, flange, plate and shell forming a liquid-tight chamber; means for selectively limiting the motion of the plate relative to the plug; means for varying the pressure on a non-compressible second liquid in the recess exterior to the liquid-tight chamber; and means for permitting the first liquid to enter and be discharged from the liquid-tight chamber, said means permitting the entry of the first liquid at a first pressure and permitting the discharge of the first liquid at a second pressure greater than the first pressure.

7. A pump for selectively pumping metered quantities of a first fluid in response to changes in a quantity selector and at those moments indicated by a timing means, said pump comprising, in combination, a housing having an upper chamber, a circular chamber with a circular wall and a circular base, and a piston chamber continuous with the upper chamber and joined by an exchange passage to the circular chamber; a sleeve extending into the circular chamber and having a plunger passage extending its length and between the upper chamber and the circular chamber; a bellows cup having a circular base plate in the circular chamber between the sleeve and the circular base of the circular chamber, a guide pin integral with the base plate and extending perpendicular to the base plate into the plunger passage of the sleeve, a cylindrical shell concentric with the guide pin and having one end closed by the base plate, and a flange extending outwardly from the cylindrical shell; a ring encircling the cylindrical shell below the flange and having an outermost edge sealably joined to the circular wall of the circular chamber above the circular base; an expandable collapsible bellows having one end sealably joined to the flange of the bellows cup and its other end sealably joined to the ring; a pumping piston with its first end extending into the upper chamber and its second end slidably inserted into the piston chamber, the first end of said pumping piston having an actuator bar slot and a transverse passage extending through it and the second end of said piston having a fluid chamber, a first fluid passage joining the fluid chamber to the piston chamber, a second fluid passage joining the fluid chamber to the transverse passage, and a third fluid passage positioned to join the fluid chamber and the exchange passage continuously as the pumping piston slidably moves in the piston chamber and to join the fluid chamber and the upper chamber when the second end of the pumping piston is substantially withdrawn from the piston chamber; a check valve having a spring and a ball positioned in the fluid chamber of the pumping piston and arranged to permit the flow of a fluid through the said second fluid passage when pressure in the fluid chamber is less than the spring pressure on the ball; a lever arm axle fixedly positioned in the upper chamber; a first lever arm having one end pivotally attached to the lever arm axle; a second lever arm having one end pivotally attached to the lever arm axle; an actuator bar rotatably extending between the first lever arm and the second lever arm and through the said actuator bar slot; a cam follower fixedly extending between the first lever arm and the second lever arm more remote from the lever arm axle than the actuator bar; a cam axle rotatably extending into the upper chamber; a cam fixedly mounted on the cam axle within the upper chamber, said cam engaging the cam follower and having a configuration which allows the cam follower to move toward the piston chamber after slowly forcing the cam follower away from the piston chamber; a pumping spring having one end engaging the first end of the pumping piston and urging the second end of the pumping piston into the piston chamber; a plunger extending from the upper chamber into the plunger passage of the sleeve; means for adjusting the position of the plunger in the plunger passage in response to changes in the quantity selector; means for rotating the cam axle, said means being rotationally responsive to the timing means; means for permitting the first fluid to enter and be discharged from the circular chamber between the circular base and the base plate of the bellows cup, said means permitting the first fluid to enter only when the fluid pressure between the circular base and the base plate is less than the pressure exerted by the pumping spring on the pumping piston and said means permitting the discharge of the first fluid only when the fluid pressure between the circular base and the base plate is greater than the fluid pressure which permits the first fluid to enter, but less than the pressure exerted by the pumping spring on the pumping piston; and a substantially non-compressible second fluid in the fluid chamber of the pumping piston, in the upper chamber, and in the circular chamber above the flange and base plate and between the bellows and the circular wall of the circular chamber.

8. A pump for selectively pumping metered quantities of a first fluid in response to changes in a quantity selector and at those moments indicated by a timing means said pump comprising, in combination, a housing having a first chamber, a second chamber with a wall joining a base, and a piston chamber continuous with the first chamber and joined by an exchange passage to the second chamber; a sleeve extending into the second chamber and having a plunger passage extending between the first chamber and the second chamber; a bellows cup having a base plate in the second chamber between the sleeve and the base of the second chamber, a guide pin extending into the plunger passage of the sleeve, a shell surrounding the guide pin and having one end closed by the base plate, and a flange extending outwardly from the shell; a ring encircling the shell below the flange and having an outermost edge sealably joined to the wall of the second chamber; a bellows having one end sealably joined to the flange of the bellows cup and its other end sealably joined to the ring; a piston with its first end in the first chamber and its second end slidably inserted into the piston chamber, the first end of said piston having an actuator bar slot and a transverse passage extending through it and the second end of said piston having a fluid chamber, a first fluid passage joining the fluid chamber to the piston chamber below the pumping piston, a second fluid passage joining the fluid chamber to the transverse passage, and a third fluid passage positioned to join the fluid chamber and the exchange passage continuously as the pumping piston slidably moves in the piston chamber and to join the fluid chamber and the first chamber when the second end of the pumping piston is substantially withdrawn from the piston chamber; a check valve having a spring and a ball positioned in the fluid chamber of the pumping piston and arranged to permit the flow of a fluid through the said second fluid passage when pressure in the fluid chamber is less than the pressure in the first chamber; a lever arm axle fixedly positioned in the first chamber; a first lever arm having one end pivotally attached to the lever arm axle; a second lever arm having one end pivotally attached to the lever arm axle; an actuator bar rotatably extending between the first lever arm and the second lever arm and through the said actuator bar slot; a cam follower fixedly extending between the first lever arm and the second lever arm; a cam axle rotatably extending into the first chamber; a cam fixedly mounted on the cam axle within the upper chamber, said cam engaging the cam follower and having a configuration which allows the cam follower to move toward the piston chamber after slowly moving the cam follower away from the piston chamber; a pumping spring having one end engaging the first end of the pumping piston and urging the second end of the pumping piston into the piston chamber; a plunger extending from the first chamber into the plunger passage of the sleeve; means for adjusting the position of the plunger in the plunger passage in response to changes in the quantity selector; means for rotating the cam axle, said means being rotationally responsive to the timing means; means for permitting the first fluid to enter and be discharged from the second chamber between the base and the base plate of the bellows cup, said means permitting the first fluid to enter only when the fluid pressure between the said base and base plate is less than the pressure exerted by the pumping spring on the pumping piston and said means permitting the discharge of the first fluid only when the liquid pressure between the said base and base plate is greater than that pressure which permits the first fluid to enter, but less than the pressure exerted by the pumping spring on the pumping piston; and a substantially non-compressible second fluid in the fluid chamber of the pumping piston, in the first chamber, and in the second chamber above the flange and base plate and between the bellows and the wall of the second chamber.

9. A pump for pumping selected quantities of fuel into an internal combustion engine in response to engine speed and the fuel requirements of the engine, said pump comprising, in combination, a housing having an upper chamber, a circular chamber with a circular wall and a circular base, and a piston chamber continuous with the upper chamber and joined by an exchange passage to the circular chamber; a sleeve extending into the circular chamber and having a plunger passage extending its length and between the upper chamber and the circular chamber; a bellows cap having circular base plate in the circular chamber between the sleeve and the circular base of the circular chamber, a guide pin integral with the base plate and extending perpendicular to the base plate into the plunger passage of the sleeve, a cylindrical shell concentric with the guide pin and having one end closed by the base plate, and a flange extending outwardly from the cylindrical shell; a ring encircling the cylindrical shell below the flange and having an outermost edge joined to the circular wall of the circular chamber above the circular base; an expandable collapsible bellows having one end joined to the flange of the bellows cup and its other end joined to the ring; a pumping piston with its first end in the upper chamber and its second end slidably inserted into the piston chamber, the first end of said pumping piston having an actuator bar slot and a transverse passage extending through it and the second end of said piston having a fluid chamber, a first fluid passage joining the fluid chamber to the piston chamber, a second fluid passage joining the fluid chamber to the transverse passage, and a third fluid passage positioned to join the fluid chamber and the exchange passage continuously as the pumping piston slidably moves in the piston chamber and to join the fluid chamber and the upper chamber when the second end of the pumping piston is substantially withdrawn from the piston chamber; a check valve having a spring and a ball positioned in the fluid chamber of the pumping piston and arranged to permit the flow of a fluid through the said second fluid passage when pressure in the fluid chamber is less than the pressure in the upper chamber; a pumping spring having one end engaging the first end of the pumping piston and urging the second end of the pumping piston into the piston chamber; a plunger extending from the upper chamber into the plunger passage of the sleeve; means for adjusting the position of the plunger in the plunger passage in response to the fuel requirements of the engine; means moving the second end of the pumping piston in the piston chamber in a reciprocating manner in response to engine speed; means for permitting fuel to enter and be discharged from the circular chamber between the circular base and the base plate of the bellows cup, said means permitting the fuel to enter only when the pressure between the circular base and the base plate is less than the pressure exerted by the pumping spring on the pumping piston and said means permitting the discharge of fuel only when the pressure between the circular base and the base plate is greater than the pressure which permits the fuel to enter, but less than the pressure exerted by the pumping spring on the pumping piston; and a substantially non-compressible liquid in the fluid chamber of the pumping piston, in the upper chamber, and in the circular chamber above the flange and base plate and between the bellows and the circular wall of the circular chamber.

References Cited by the Examiner

UNITED STATES PATENTS

| | | | |
|---|---|---|---|
| 2,843,044 | 7/1958 | Mashinter | 103—44 |
| 2,843,045 | 7/1958 | Mashinter | 103—44 |
| 2,856,857 | 10/1958 | Saalfrank | 103—44 |
| 3,106,164 | 10/1963 | McCormick | 103—44 |

LAURENCE V. EFNER, *Primary Examiner.*